Feb. 14, 1961  W. S. CAHILL  2,971,563
METHOD AND APPARATUS FOR APPLYING TREAD TO RUBBER TIRES
Filed Oct. 2, 1956  5 Sheets-Sheet 1

INVENTOR
WILLIAM S. CAHILL

BY Gustave Miller
ATTORNEY

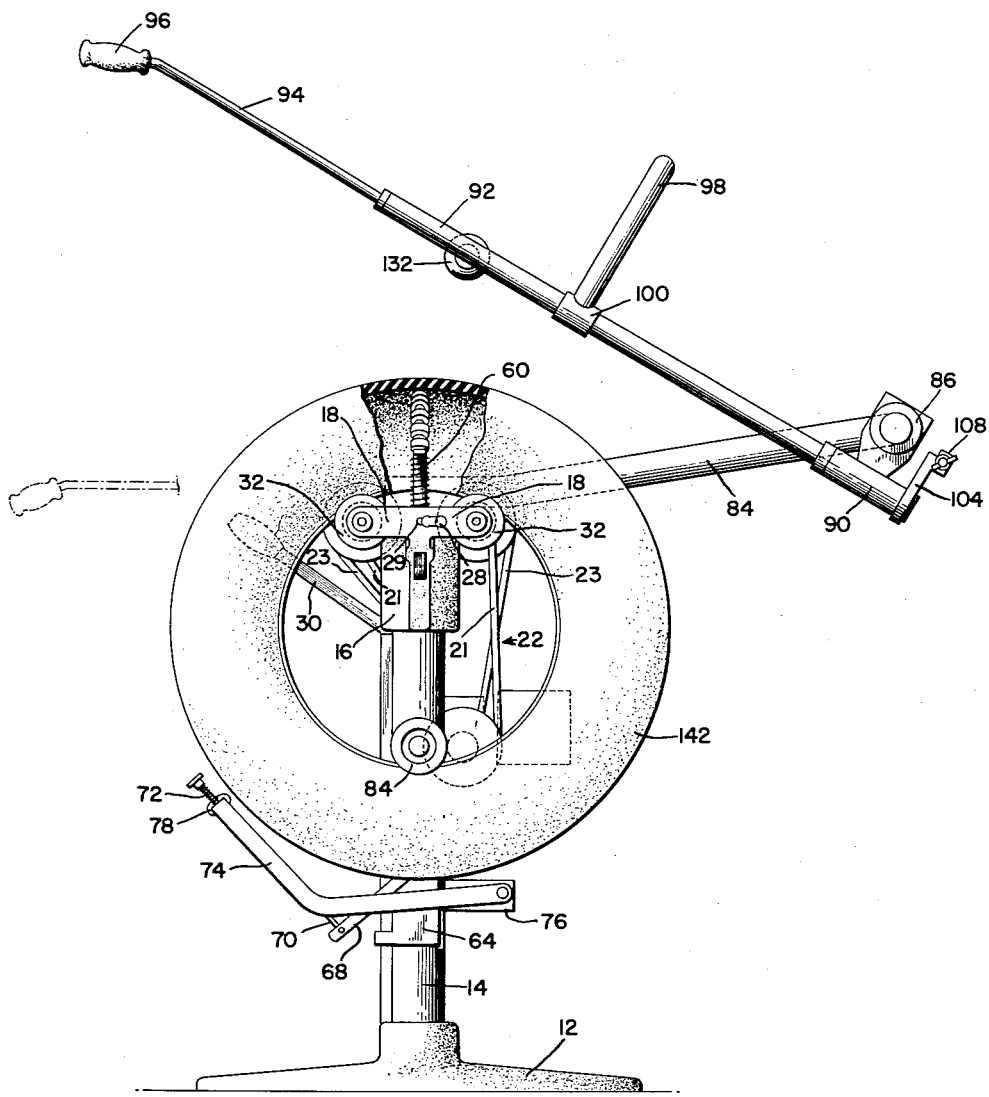

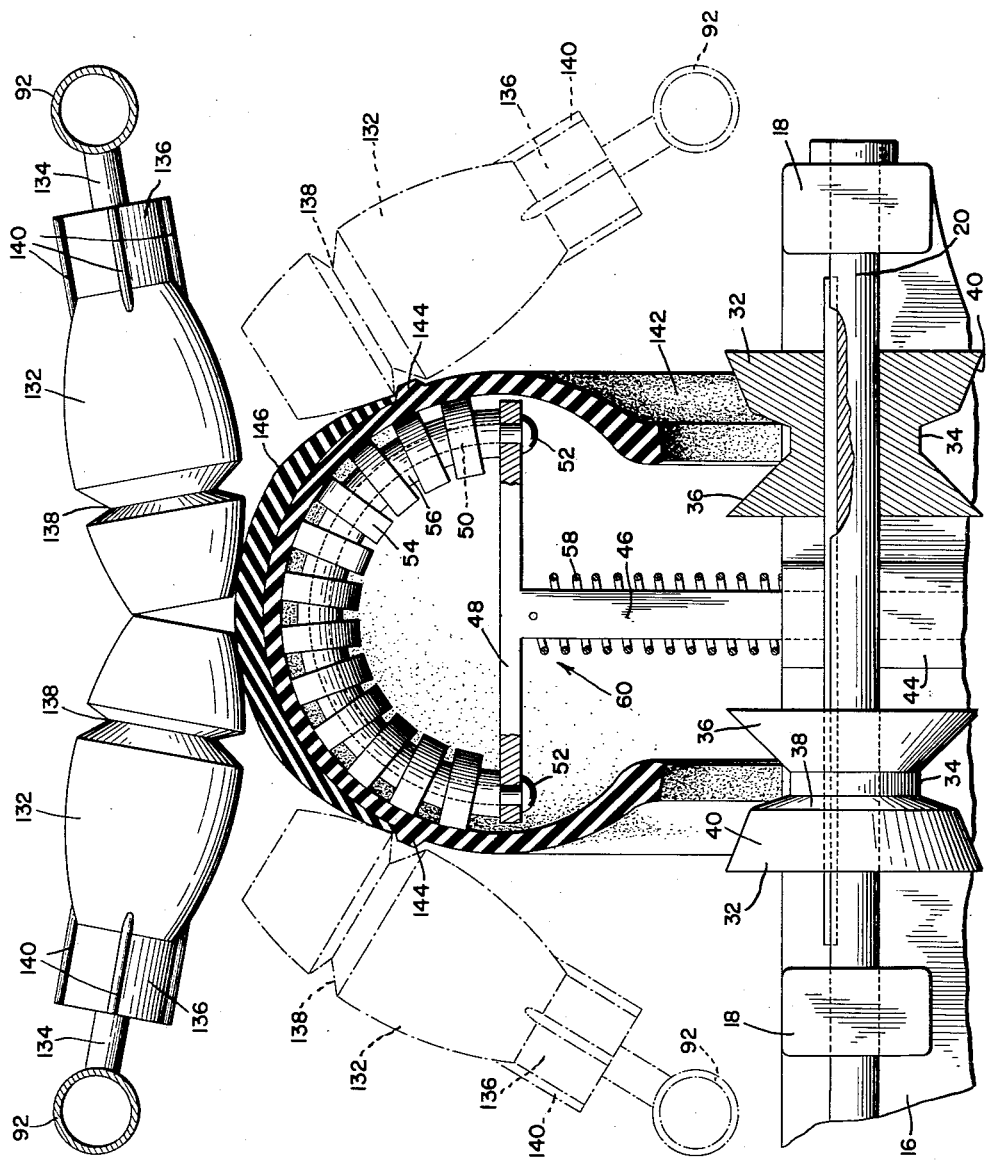

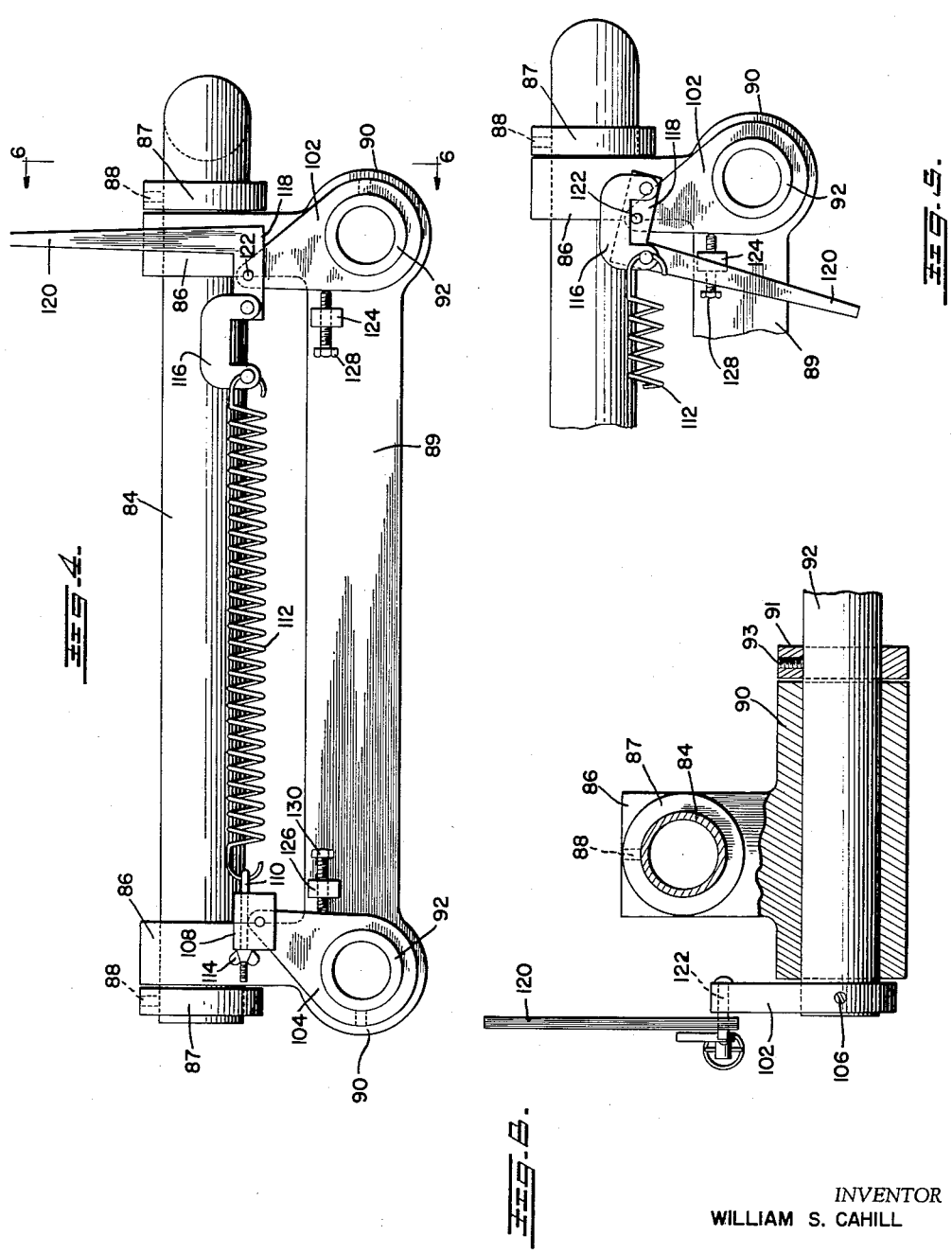

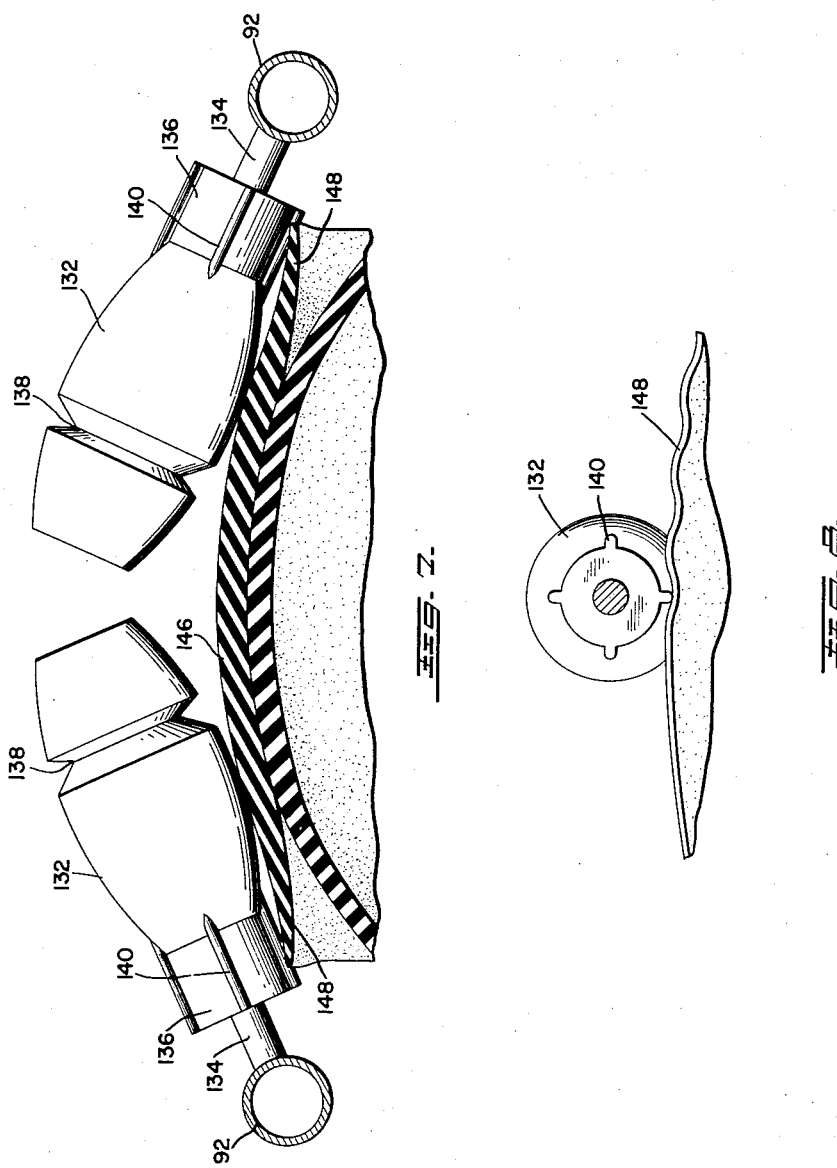

United States Patent Office 2,971,563
Patented Feb. 14, 1961

2,971,563
METHOD AND APPARATUS FOR APPLYING TREAD TO RUBBER TIRES

William Sterling Cahill, 306 Court St., Danville, Va.
Filed Oct. 2, 1956, Ser. No. 613,501
5 Claims. (Cl. 154—9)

This invention relates to a method and apparatus for applying a tread to a rubber tire, and it more particularly relates to a method and apparatus for applying a re-tread to the tire.

In the application of new treads on worn tires, the old tread is first ground or buffed off and a rubber strip, known in the trade as a camelback, is placed over the buffed portion and bonded thereto. This camelback, when in position, generally extends over the face of the tire and overlaps the sides of the tire by about one-third the width of the sidewalls. In many of the newer tires, a projection is provided on the side walls, this projection is known as a curb guard since it acts to absorb the wear and friction when the tire scrapes against a curb or the like. In such tires, the camelback extends down to these curb guards.

It is impossible to obtain a good bond between the camelback and the buffed surface without applying a predetermined amount of pressure to the camelback and forcing its soft surface into the crevices of the buffed surface in order to force out any air that may be trapped between the two surfaces; this operation is generally known as "stitching."

Heretofore, the "stitching" operation was usually accomplished manually. Such manual operation, however, requires the exercise of great skill and care since, if the camelback is not smoothly and evenly conformed to the curvature of the buffed tire surface, air pockets will occur. If all parts of the camelback are not stitched or if any air pockets occur between the two surfaces, a poor bond will result. Such poor bond may result in the separation of the new tread from the tire after only a short period of use; or such separation may even occur during the curing process, while the tire is in the mold. Furthermore, the labor costs incidental to the use of highly experienced and skillful labor, often makes the process commercially infeasible. In addition, since the manual operation is necessarily slow, the operator tends to work as rapidly as possible, and by sacrificing care to speed, increases the percentage of defective work.

The present invention overcomes the above disadvantages by providing a machine which rapidly and efficiently stitches the camelback onto the buffed tire, and which can be operated by relatively unskilled labor.

Another object of the present invention is to provide a machine that will stitch camelback without any distortion or damage to any portion of a tubeless tire.

Another object of the present invention is to provide a method and apparatus for efficiently applying a camelback to a tire having a curb guard.

Another object of the present invention is to provide a method and apparatus for easily and efficiently applying a retread to either a passenger or truck tire.

Other objects of the present invention are to provide an improved machine, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which:

Fig. 2 is a side view, partly in elevation and partly in section, of the machine shown in Fig. 1, there being a tire in working position thereon.

Fig. 3 is an enlarged, detailed view, partly in elevation and partly in section, showing the working portions of the machine in operative relationship to the workpiece.

Fig. 4 is an enlarged, detailed, elevational view of the mounting for the tool holding arms.

Fig. 5 is a fragmentary view of the right hand portion of Fig. 4, with the spring lever shown in reverse position.

Fig. 6 is a view, partly in section and partly in elevation, taken on line 6—6 of Fig. 4.

Fig. 7 is an enlarged view, partly in section and partly in elevation, showing the device in use on a truck tire.

Fig. 8 is a view, in side elevation, of one of the tools of Fig. 7, shown in operation on the truck tire re-tread.

Figure 1:
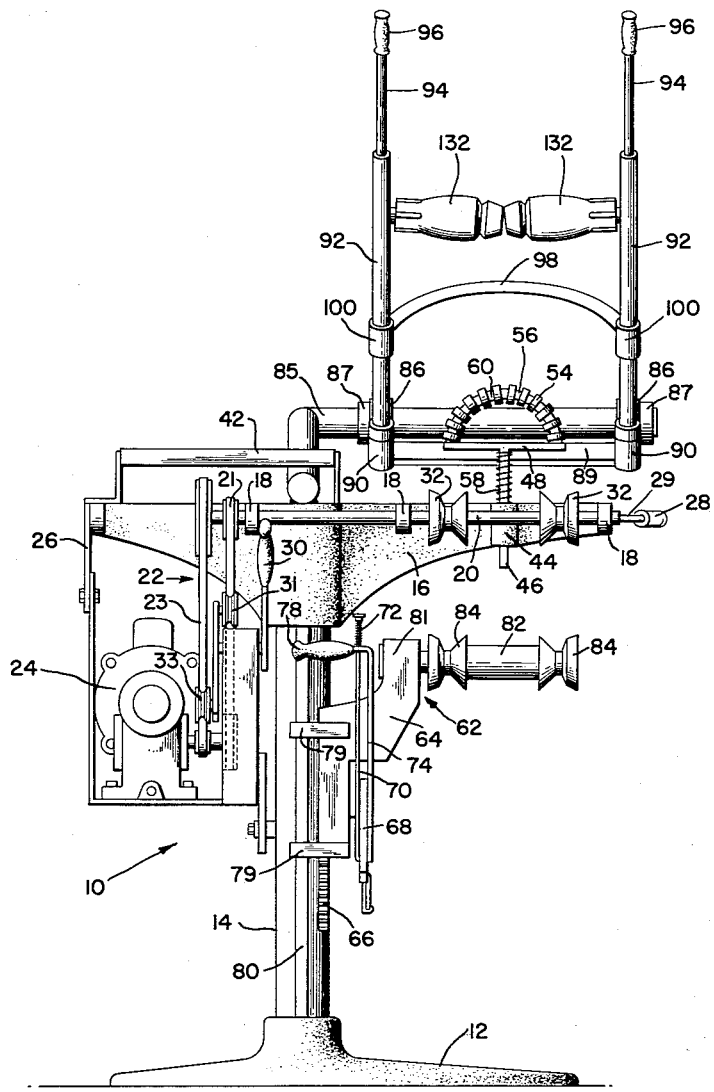
Fig. 1 is a front elevational view of a machine embodying the present invention.

Referring now in greater detail to the drawings wherein similar reference characters refer to similar parts, there is shown a stitching machine, generally designated 10, comprising a base 12, a standard 14 on the base, and a platform 16 fixed on the standard.

Bearing blocks 18 extend from front and rear of the platform 16 and support a front and rear shaft 20. Each shaft 20 is mounted for rotation in its respective bearing blocks and is provided with a belt and pulley drive assembly, generally indicated at 22. The belt and pulley system provide a two speed transmission operatively connecting each shaft 20 to the motor 24 which is mounted on a bracket 26 connected to the platform 16.

A transmission control lever 30 is connected to a pair of idler pulleys 31 and 33, and when the lever 30 is pivoted in one direction it presses idler pulley 31 to tension against low speed belt 21 and releases idler pulley 33 from high speed belt 23, and when lever 30 is pivoted in the opposite direction, idler pulley 31 is released from low speed belt 21 and idler pulley 33 is tensioned against high speed belt 23. At the intermediate position, both idler pulleys are released from tension position. Hence, shaft 20 may be rotated at either high or low speed, or may be left in non-rotating position, while motor 24 operates at a steady speed.

Positioned on each shaft 20, between the ends thereof, are a pair of drive rollers or spools 32. Each drive roller 32 is provided with a central groove 34, an inclined or beveled surface 36 at one side of the groove, and a double bevel at the opposite side of the groove. The double bevel comprises an inner surface 38 and an offset surface 40, as best seen in Fig. 3.

A work holding tray 42 is provided at the left side of the platform, as viewed in Fig. 1, while at the opposite side of the platform, between the drive rollers on each shaft, there is provided a vertical bearing 44 in platform 16 through which extends a stem 46 having a cross-head 48. A control handle 28 is provided on a latch pin 29 extending through the platform 16 and bearing 44 to lock the stem 46 and thus hold the anvil 60 in set position. A curved shaft or core 50 extends in an arc from one side to the other of the cross-head and is held in place by rivet heads 52. A plurality of bearing rollers 54 spaced from each other by spacer collars 56, are mounted on ball bearings (not shown) on the arcuate shaft or core 50. A coil spring 58 surrounds the stem 46 and is positioned between the upper end of the bearing 44 and the cross-head 48. This spring acts to resiliently urge the cross-head, and all it carries, upwardly to operative position and latch pin 28 is then used to lock the assembly in such operative position. The entire assembly, including the spring-pressed stem, cross-head, arcuate core, bearing rollers and spacer collars, form an "anvil," generally designated 60.

Vertically adjustable on the standard 14, below the platform 16, is a pressure roller assembly 62. This assembly includes a housing 64 having a vertical channel embracing a rack bar 66 on the standard. A ratchet, not shown, is provided in the housing to releasably engage a tooth on the rack bar to hold the housing in adjusted vertical position. This ratchet is connected to a lever 68, to one end of which is pivotally connected a rod 70 having a head 72. A bent operating arm 74 is pivotally connected to a bracket 76 on the standard and is also connected to the housing; and serves to raise and lower the housing when the ratchet is released from the teeth of the rack bar.

The rod 70 extends parallel to and closely adjacent the upper bent portion of the arm 74. The arm 74 is provided with an offset handle portion 78, through which the rod 70 slidingly extends, the head of the rod being on the opposite side of the handle portion 78.

The housing 64 is supported on the standard by brackets 79 embracing a key or track 80. The housing is raised and lowered by pulling the rod to release the ratchet and then actuating the arm 74 to move the housing up. Then the rod is actuated to engage the ratchet with the rack bar to hold the housing in its new vertical position.

A journal portion 81 is provided at the upper end of the housing 64 and, in this journal, is provided a rotatable shaft 82. A pair of spaced idler rollers 84, of a spool shape similar to that of rollers 32, are provided on the shaft 82.

Mounted on the platform 16 is a support arm 85 on which are provided a pair of bearing blocks 86 held in place by collars 87. Collars 87 are held on the arm 85 by set screws 88. These bearing blocks are integral with a cross-brace 89 below the support arm. At each end of the cross-brace 89, there is provided a bearing sleeve 90, held by a collar 91, fastened by a set screw 93. Rotatably positioned in each bearing sleeve 90 is one end of a shaft 92 of preferably tubular construction; these shafts 92 extending forwardly in parallelism with each other. At their forward ends, each shaft 92 is fitted with an extension 94 having a handle 96. An arcuate brace bar 98 is connected to each shaft 92 by collars 100.

A cam lever 102 is mounted on one shaft 92, at the rear side of the cross-brace 89, and a similar cam lever 104 is mounted on the other shaft 92 in similar position. These cam levers are releasably held on their respective shafts by set-screws such as shown at 106 in Fig. 6. A block 108 is connected at the tapered end of cam lever 104, and through this block 108 freely extends a screw 110. This screw is connected at one end to a spring 112, and at its opposite end is provided with a wing nut 114. The nut 114 can be tightened or loosened to adjust the tension on the spring 112, the opposite end of which is connected to a toggle link 116. The link 116 is, itself, pivoted, at its opposite end, to the offset arm 118 of a lever 120; this offset arm of the lever being pivoted to the cam lever 102, as at 122.

Blocks 124 and 126 are provided on cross-brace 89 adjacent each cam lever 102 and 104 respectively, and through these blocks are threaded adjusting screws 128 and 130. By threading these adjusting screws one direction or the other, the cam levers are adjustably rotated and this, in turn, rotates the corresponding shaft 92 on its axis.

The lever 120 is actuated to the position shown in Fig. 5, when high tension is required in the spring, as when operating on truck tires having heavy rubber. For light passenger car tires, the low tension spring position of Fig. 4 is preferable.

The spring 112 provides equal tension on the stitcher rollers, which will be hereinafter described, and also permits these rollers to arc upwardly.

Connected to each shaft 92, intermediate the ends thereof, is a stitching roller 132; each stitching roller being rotatable on a shaft 134 extending laterally from its corresponding shaft 92. The rollers are so positioned that they extend toward each other.

Each stitching roller comprises a barrel-like body having a reduced cylindrical portion 136 at one end and having a beveled groove 138 between its median portion and its opposite, free end. A plurality of spaced fins 140, here shown as four in number, extend radially from the portion 136.

In operation, the buffed tire, such as indicated at 142 in Fig. 2, is mounted over the anvil 60 by inserting the anvil into the tire and permitting the inner surface of the tire to rest thereon. The anvil, due to its arcuate construction, supports an area inside the tire of about 180 degrees. This area of the tire, furthermore, rests on many independent bearing surfaces represented by the various bearing rollers 54. This is especially advantageous because when a tire is rotated along this supporting anvil, the various areas of the tire are turning at different speeds due to their varying radii relative to the axis of rotation.

Ordinarily, this would result in slippage. However, since each individual bearing roller rotates at its own speed, which is correlated with the rotational speed of the corresponding tire surface area, such slippage is avoided, thereby eliminating dragging or scuffing of the inner surface of the tire. This is a radical difference from and substantial improvement over the solid or two section anvil used heretofore.

The anvil 60 fits all passenger car tires since such tires are ordinarily flexible enough to be conformed to the outer radius of the anvil. The anvil itself, by being spring-pressed upwardly, quickly conforms the tires to its radius.

When the tire is mounted on the anvil, as explained above, the beads of the tire rest on the four drive rollers 32. These drive rollers are specially designed to carry all size tire beads without adjustment and, in this way, differ radically from previous type rollers. The type of rollers previously used, for the most part, were of the corrugated flat-face type, having flanges on each end wide enough apart to take the large beads on heavy truck tires. When small bead tires, such as passenger car tires, were placed on these prior type of rollers, the beads did not fit snugly enough between the flanges. As a result, the tire tended to wobble and weave as it was rotated over the rollers, making it difficult, if not impossible, to apply the new camelback straight and even over the buffed surface. Furthermore, the corrugations or knurling on the rollers tended to distort and damage the beads on the tires, which is particularly bad in the case of tubeless tires, for air is sealed in tubeless tires by the beads, and any distortion of these beads will cause air leaks when the tire is mounted on the rim of the wheel.

The drive rollers 32 of this invention, however, are smooth finished and have no corrugations or knurling. Furthermore, the three beveled surfaces 36, 38 and 40 provide wedge-shaped supports wherein surfaces 36 and 38 securely engage all passenger car and small truck tire beads whereas surfaces 36 and 40 securely engage all large truck tire beads. The wedging action of these surfaces prevents any wobble or weave during rotation of the tire. Furthermore, the wedging angle of the surfaces are so designed that they frictionally engage the outer portion of the tire beads with sufficient friction to rotate the tire.

The tire is held on the four drive rollers 32 by the press rollers 84. These press rollers are moved into position overlying the beads at the lower end of the tire, as shown in Fig. 2, by adjustment of the housing 64. These rollers 84 exert a positive biased downward pressure on the tire bead which overcomes the spring pressure on the anvil 60 and forces the tire beads against the drive rollers.

With the tire now in position on the rollers, with handle 28 locking anvil 60 in position, the camelback is placed over the crown of the tire, this crown having previously been buffed and coated with cement. The tire is then rotated one revolution at low speed during which time the camelback is cut and butted. At this point, the camelback is provided completely around the tire, but only touching it at the peak of the crown.

Now, the drive belt system is coupled to the motor 24 by the lever 30 and its high speed pulley 33 and belt 23, and the drive rollers actuate to rotate the tire at high speed. At the same time, the stitcher roller assembly is brought down so that the stitcher rollers rest on the camelback so that the tire is now confined between the stitcher rollers and the anvil.

As the tire revolves, the stitcher rollers are pressed against the tire and are then gradually swivelled from the position shown in full line in Fig. 3 to the position shown in dotted outline. This swivelling is caused by yielding of spring 112 to manual pressure exerted downwardly on the handles 96, thereby rotating the shafts 92 against the pressure of spring 112. This rotation of the shafts 92 changes the angular pressure on the stitcher rollers 132 as the angular position of the rollers changes. In this manner, the cameback is closely conformed and adhered to the curvature of the tire, stitching from the center outwardly thereby eliminating any possibility of air pockets. If curb guards are provided on the tire, such as shown at 144 in Fig. 3, the beveled surface of the groove 138 of the stitcher rollers engage the side of the curb guard in a line contact, such as shown in Fig. 3, as a result of which the camelback is effectively stitched right to the edge of the curb guard. Heretofore, these curb guard edges required manual stitching which was necessarily time-wasting, arduous and costly.

The above operation pertains to smaller tires of the passenger car type. However, when large truck tires are to be retreaded, the anvil 60 is removed since the truck tires are so rigid that a back rest or anvil is not necessary. The new rubber or camelback is commercially procured in flat rolls and the strips forming these rolls must be conformed to the curvature of the individual tire. It was, therefore, necessary, heretofore, to shrink the outer edge or "wing section" of the camelback to a smaller diameter than the tread section of the rubber strip.

In this operation, there is a tendency for the rubber to fold over or knot up in various areas along the side walls. These knots and folds are highly undesirable and must be trimmed off before adhesion of the camelback to the tire is fully effected.

This problem has now been overcome by the provision of fins 140 on the stitcher rollers. As is shown in Figs. 7 and 8, when the stitcher rollers are swivelled to a steeper angular position relative to the camelback 146, the fins 140 engage the wings 148 of the camelback, which are suspended over, but not touching, the tire walls. As the fins roll along the edge of the rubber camelback, they effect a breaking or pleating action as each fin 140 contacts the wing 148, it first causes a stitching action to take place to the tire under pressure of the fin 140. As the fins are spaced 90° about the roller portions 136, a pleating action takes place, that is, the wings first form pleats attached at spaced apart lines of contact to the tire, so that, as the handles 96 are then pressed further down, the finned portion 136 of rollers 132 moves beyond the ends of the wings 148, and the roller then stitches the intermediate portions of the formed pleats on wings 148 in a smooth stitching action to the truck tire, the fact that the pleats are already stitched at spaced apart lines of contact preventing the undesirable knotting or folding over of the wings 148. This pleating is even, as indicated in Fig. 8, so that the rubber is caused to shrink evenly when it comes into contact with the smooth portion of the roller. As the rollers 132 are swivelled angularly while pressure is applied, the pleated wings or edges of the camelback are evenly adhered to the side walls of the tire.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A device for applying a tread to a tire comprising a base, a standard on said base, a support on said standard, a pair of tire bead engaging drive rollers rotatably mounted on said support, drive means for rotating said drive rollers, a pressure roller assembly vertically movable on said standard below said drive rollers for each of the two tire beads, including a pressure roller for each tire bead in said assembly, in vertical alignment with said drive rollers, thereby providing three point support on each tire bead said drive rollers and each pressure roller being of similar, generally smooth, spool-shaped contour, and a stitcher roller assembly pivotally connected to said support, said stitcher roller assembly including a pair of pivoted arms, each having a rotatable stitcher roller extending laterally therefrom toward each other and arranged to apply lateral as well as direct pressure on the tread on the tire as said arms are pivoted downwardly.

2. The device of claim 1, each drive and pressure roller having a peripheral groove separating a first bevelled surface from a surface having a double bevelled configuration wherein there are two angularly offset bevelled surfaces.

3. The device of claim 1 wherein an anvil device having an arcuate bearing surface is releasably secured to said support between said drive rollers, said anvil device being spring-biased upwardly and its arcuate bearing surface comprising a plurality of individually rotatable bearing rollers.

4. The device of claim 1 wherein said stitcher rollers are each generally barrel shaped and are peripherally grooved adjacent their free ends.

5. In a stitcher machine for applying tread to tires, a support, a support arm on said support, a cross-brace rockably mounted on said support arm, a bearing sleeve at each of the ends of the cross-brace, a tubular shaft mounted in each bearing sleeve with one end of the shaft pivoted for axial rotation within the bearing sleeve and the other extending free, a spring connecting the tubular shafts to each other adjacent the cross-brace, means to adjust the tension of said spring, a handle at the free end of each tubular shaft, and a laterally-extending stitcher roller rotatably connected to each tubular shaft intermediate its ends, said stitcher rollers each being generally barrel-shaped and extending toward each other and movable simultaneously by operation of said handles toward the periphery of the new tread being applied on the tire and laterally away from each other for applying direct and lateral stitching pressure on the new tread.

References Cited in the file of this patent

UNITED STATES PATENTS

| | | |
|---|---|---|
| 1,711,473 | Putt | Apr. 30, 1929 |
| 1,956,982 | Denmire | May 1, 1934 |
| 2,381,379 | Stevens | Aug. 7, 1945 |
| 2,409,571 | Leguillon | Oct. 15, 1946 |
| 2,509,328 | Anderson | May 30, 1950 |
| 2,556,264 | Flynn | June 12, 1951 |
| 2,649,892 | Appleby | Aug. 25, 1953 |
| 2,717,022 | Duerksen | Sept. 6, 1955 |
| 2,729,269 | Antraigne | Jan. 3, 1956 |
| 2,737,226 | Jimmerson | Mar. 6, 1956 |
| 2,808,872 | Clapp | Oct. 8, 1957 |
| 2,814,331 | Vanzo et al. | Nov. 26, 1957 |

FOREIGN PATENTS

| | | |
|---|---|---|
| 23,222 | Austria | Oct. 1, 1905 |
| 1,035,752 | France | Apr. 22, 1953 |